(12) United States Patent
Ringl (10) Patent No.: US 8,705,830 B2
(45) Date of Patent: Apr. 22, 2014

(54) METHOD AND DEVICE FOR PROCESSING 3-D IMAGE DATA OF A SKULL

(75) Inventor: Helmut Ringl, Schwechat (AT)

(73) Assignee: Medizinische Universitaet Wien, Vienna (AT)

(*) Notice: Subject to any disclaimer, the term of this patent is extended or adjusted under 35 U.S.C. 154(b) by 51 days.

(21) Appl. No.: 13/390,000

(22) PCT Filed: Aug. 11, 2010

(86) PCT No.: PCT/AT2010/000295
§ 371 (c)(1),
(2), (4) Date: Feb. 10, 2012

(87) PCT Pub. No.: WO2011/017730
PCT Pub. Date: Feb. 17, 2011

(65) Prior Publication Data
US 2012/0141008 A1  Jun. 7, 2012

(30) Foreign Application Priority Data
Aug. 11, 2009 (AT) .................. A 1263/2009

(51) Int. Cl.
G06T 19/00 (2011.01)
(52) U.S. Cl.
USPC .......................................... 382/131; 382/154
(58) Field of Classification Search
None
See application file for complete search history.

(56) References Cited

U.S. PATENT DOCUMENTS

| | | | |
|---|---|---|---|
| 5,335,173 A * | 8/1994 | Sasahara .................... 600/407 |
| 6,181,348 B1 | 1/2001 | Geiger | |
| 7,542,595 B2 | 6/2009 | Moreau-Gobard | |
| 2004/0161144 A1 | 8/2004 | Barth | |
| 2005/0018888 A1 | 1/2005 | Zonneveld | |
| 2012/0063655 A1* | 3/2012 | Dean et al. ................... 382/128 |

FOREIGN PATENT DOCUMENTS

| DE | 10254908 A1 | 6/2004 |
|---|---|---|
| DE | 112004001440 T5 | 8/2007 |

OTHER PUBLICATIONS

Rusinek et al. "Quantitative and Qualitative Comparison of Volumetric and Surface Rendering Techniques." IEEE Transactions on Nuclear Science, vol. 38, issue 2, Apr. 1991, pp. 659-662.*
Monga et al. "Using Partial Derivatives of 3D Images to Extract Typical Surface Features." Proceedings of the Third Annual Conference of AI, Simulation and Planning in High Autonomy Systems, Jul. 8, 1992, pp. 225-236.*
Robb et al., "Interactive display and analysis of 3-D medical images," in IEEE Transaction on Medical Imaging, IEEE Service Center, vol. 8(3), Sep. 1, 1989, pp. 217-226.

* cited by examiner

Primary Examiner — Jon Chang
(74) Attorney, Agent, or Firm — Joyce von Natzmer; Agris & von Natzmer LLP (57) ABSTRACT

The invention relates to a method and a device for processing 3-D image date of a skull (S), wherein image date are selected or calculated for the 3-D image data and are presented as 2-D image data in a plane. For fast, overview-like inspection of the skull surface (S), the skull surface (O) is determined from the 3-D image data, and the corresponding image data at a defined distance (d) from the skull surface (O) are determined and presented as 2-D image data in a plane.

20 Claims, 8 Drawing Sheets

METHOD AND DEVICE FOR PROCESSING 3-D IMAGE DATA OF A SKULL

CROSS-REFERENCE TO RELATED APPLICATIONS

This is the U.S. national stage of International application PCT/AT2010/000295, filed Aug. 11, 2010 designating the United States and claiming priority to Austrian Patent Application No. A 1263/2009, filed Aug. 11, 2009.

BACKGROUND OF THE INVENTION

1. Field of the Invention

The invention relates to a method and a device for processing 3D image data of a skull, wherein image data are selected or calculated from the 3D image data and are presented as 2D image data in one plane.

2. Description of Related Art and Introduction

There are a series of imaging methods which are used for presenting a human or animal skull such as, e.g. computer tomography methods, magnetic resonance tomography methods, positron emission tomography methods or the like. With such imaging methods, a multiplicity of 3D image data with extremely high information content is created from which the attending physician, depending on the purpose of the diagnosis or therapy, processes accordingly a desired partial quantity and presents it in a two-dimensional form as 2D image data. Thus, the multiplicity of 3D image data makes it difficult and time-consuming for the attending physician to make a diagnosis. The present invention is focused on methods for processing the image data of human or animal skulls which allow a faster diagnosis by the attending physician or personnel.

In particular in the case of accident-related skull injuries or infarcts, a fast diagnosis for enabling a fast medical intervention is essential. The accident-related skull injury is one of the most frequent reasons in the western world for physical and mental disability as well as death. It is estimated that in the United States of America at least 1.5 million persons per year suffer a skull injury. Approximately 51,000 thereof die per year, 290,000 are hospitalized and 1.2 million persons are treated and then discharged from the emergency room.

Depending on the clinical presentation of the patient and the medical history, a significant portion of these patients undergoes a computer tomography. Computer tomography has established itself as the reference standard for clarification of a suspected skull injury and enables a fast presentation and clarification of the injury pattern and potential complications within the skull.

While the diagnosis of a hemorrhage within the skull, the accident-related direct damage to the brain and the accident-associated infarct are the most important clinical questions which can be answered by means of computer tomography, the question concerning fractures in the skullcap and also in the skull base is the second most important one. Fractures in the skullcap and also in the skull base can involve the following complications: CSF fistula, neurovascular damages, meningitis, facial paralysis, deafness, laceration of vessels or dissections and shunt formations between arteries and veins. In regular diagnoses, fractures serve as indicators for a proximal associated injury such as, e.g. hemorrhages. In addition, fractures can also result in subsequent complications, in particular hemorrhages, even if there was initially no hemorrhage. Furthermore, depending on the respective case, the presence of fractures can have potential consequences in the legal and forensic sector, for example in the case of third party negligence, because for generating a skull fracture, a certain minimum level of violence is necessary. The newest generation of multi-detector computer tomographs offers a steadily increasing spatial resolution along the craniocaudal axis of the patient along with a proportionally increasing number of axial images. This improvement offers new possibilities for the insight into anatomical and pathological structures which have to be considered for the diagnosis. In daily clinical routine, these images are primarily diagnosed in the axial plane (in the imaging plane). Usually, the resolution provided by the imaging device is not fully utilized and for practical purposes, layers are calculated that are thicker than the device can offer. The maximum number of images examined during a computer tomography of the skull with modern scanners is more than 500 images in one plane if only the bone structure is examined and the soft tissue is disregarded. To date, three-dimensional reconstructions of the skull and the skull base are prepared only in exceptional cases if there are uncertainties during the initial diagnosis of the axial images or if a complex mechanism of injury is given which, based on the axial images, cannot be clearly explained by the diagnosing radiologist. However, the number of images and the complex anatomical situation of the skullcap imply that smaller fractures can be overlooked here.

Additional three-dimensional reconstructions of the skullcap and the skull base can help the radiologist to significantly increase the detection rate of fractures. In today's practice, however, this is usual only in special cases because 3D reconstructions require additional time of the radiographer and/or the radiologist and, of course, the evaluation of these 3D reconstructions is time-consuming. Furthermore, there is no standard and no evidence to indicate which of the available 3D reconstructions is the most suitable one for this purpose. Currently, there are only methods which generate a plurality of views of the skullcap so that many additional images have to be evaluated which, in turn, is time-critical.

Up to now, several studies have researched three-dimensional reconstructions of the facial skull and have dealt with the three-dimensional reconstruction of the skull base. There is no literature in existence which is exclusively concerned with the detection of skullcap fractures by means of computer tomography images. The 3D algorithms used for the above-cited studies include surfaced shading display (SSD) and volume rendering (VR) and for an exact view and alteration, need adequately powerful workstations and usually also the preparation of a film sequence in which the skull rotates about different axes and thus can be viewed from different sides. Again, the disadvantage is the time consumption required for this and the number of images which have to be generated for such a film.

It is therefore an object of the present invention to create an above-mentioned method and an above-mentioned device for processing the 3D image data of a skull, which allow a 2D overview presentation of certain parts of the skull which enables the attending physician or the diagnosing person to perform a particularly fast diagnosis. The required computation and cost expenditures shall be as low as possible. Disadvantages of the prior art shall be avoided or at least reduced.

BRIEF SUMMARY OF THE INVENTION

This object is achieved by an above-mentioned method in which from the 3D image data, the skull surface is determined, the corresponding image data at a defined distance from the skull surface are determined and are presented as 2D image data in one plane. According to the invention, the skull surface is determined from the 3D image data of the skull which, for example, were previously collected with a computer tomograph, and the image data at a defined distance from the skull surface are determined from the 3D image data and presented in one plane, for example on a monitor. The skull is quasi folded-open and the image data of the regions of the skullcap relevant for the physician or the diagnosing person are presented in one plane. In particular for fracture diagnostics, significant support can be provided in this manner to the attending physician or the diagnosing person.

All other structures such as, for example, vessel channels and unevenness on the inner side of the skullcap (impressions digitatae) can be removed by the method and therefore can no longer be misinterpreted as fractures. The result is an image of the skullcap or the skull base which enables the radiologist or the diagnosing person to detect fractures within seconds. Compared to the axial raw images according to common practice, the detection rate of fractures is significantly increased. In addition, with this method it is not necessary to set rather high standards for the necessary experience of the medical personnel in terms of a fast and reliable detection of fractures, for example.

In addition, the method also allows presenting other pathological changes of the skull such as, for example, a perfect visualization of the cranial sutures. A premature closure of a suture in the skullcap can result in a permanent deformation of the skull (tower skull or scaphocephaly); therefore, a timely diagnosis is essential. Completely folding-open the skull according to the invention results in facilitation of surgical planning and improvement of therapy monitoring.

Furthermore, computer tomography is also used for oncological patients for presenting brain metastases. The skullcap in which likewise metastases can occur often receives no consideration in this context because here again, a diagnosis is very time-consuming. Thereby, osteolytic or osteoplastic metastases can be overlooked. With the method according to the invention, the detection of such changes can be improved also in this field; the focus or the plane to be presented here lies between the outer and the inner skullcap layers, the so-called diploe.

Finally, the present image processing method is suitable for the presentation and diagnosis of changes inside the skullcap, in particular for a fast presentation of hemorrhages in stroke patients.

The skull surface is preferably determined in such a manner that a virtual, planar net with a certain number of nodes having a certain mesh width to each other is moved along an axis perpendicular to said net and over the skull, and in each case the one position of the axis, which is reached when the 3D image data at the node reach or exceed a predetermined threshold, is assigned to the nodes of the net. According to this method, the virtual, originally planar net is virtually placed over the skull and the corresponding image data in each node of the net together with the spatial information in the coordinate system is determined and stored for the subsequent presentation in one plane. The originally planar net corresponds image point by image point to the display or the monitor on which the two-dimensional reconstruction of the skull is imaged. Preferably, the original position of all nodes of the net as well as the position of all nodes after adaptation to the skull cap is stored. Thereby, it is possible through simple transformation or distortion along the nodes to assign volume information, e.g. the density, from the segmented layer from the 3D data to the 2D data, that is, the plane of projection.

As an axis along which the virtual planar net is moved over the skull, preferably, a central axis through the skull can be determined. This ensures that the presentation of the 2D image data in one plane takes place in a centered manner.

According to a further feature of the invention it is provided that the central axis through the skull is determined in that two pairs of parallel virtual planes preferably arranged at right angles to each other are formed, the planes of each pair are moved from a position on both sides of the skull toward each other, outer virtual boundary planes are specified as soon as the 3D image data in these virtual boundary planes reach a predetermined threshold value, and the central axis is defined as the section axis of the center planes arranged between the parallel boundary planes. Thus, in this method variant, virtual planes are moved toward the skull. As soon as the 3D image data exceed a predefined threshold, for example a density value in Hounsfield units (HU), the planes come to a stop thereby defining the respective boundary planes. The skull is quasi clamped between the virtual boundary planes and thereby, the central axis is defined.

As already mentioned above, a predefined density value, preferably a certain value of the Hounsfield unit (HU), can be used as a predefined threshold value. In computer tomography, the Hounsfield unit is used for defining the absorption in the tissue.

After the determination of the skull surface from the 3D image data, smoothing the data can be carried out. Thereby, artifacts caused by, for example, medical apparatuses such as hoses, cables and respirators, can be reduced or eliminated. Smoothing can be performed according to different algorithms which run in the form of a loop through the spatial coordinates. The smoothing result can be improved in that the loop is frequently repeated, for example up to 100 times.

According to another feature of the invention it is provided that between in each case three adjacent nodes of the virtual net, in each case one triangle is formed, the normal vector on each triangle is formed, and from the determined skull surface into the inside of the skull, all 3D image data along straight lines parallel to each normal vector in a selected length range up to the defined distance from the skull surface are collected, and target values are calculated therefrom and stored. This can be performed by simple transformation or distortion for each triangle point along straight lines parallel to the normal vector on the triangle so that the matrix of the reconstruction is without boundaries. Thus, by means of these method features, a segmentation of the skull surface and, depending on the mesh width of the virtual net, the generation of a certain number of vectors pointing normal to the skull surface into the inside of the skull takes place. Along straight lines parallel to each normal vector of each triangle, 3D image data in a selected length range up to the defined distance from the surfaces are collected and corresponding target values on each straight line are calculated therefrom, stored and finally presented in one plane as 2D image data.

The one value of the 3D image data in the selected length range along each straight line, the density value of which value is at a maximum, can be calculated and stored as a target value. According to this so-called maximum intensity projection (MIP) method, the 3D image data with maximum intensity along the selected length range are evaluated. This method is most suitable in particular for fracture diagnostics.

According to an alternative procedural method, it is also possible to calculate and store as a target value the one value of the 3D image data in the selected length range along each straight line, the density value of which value is at a minimum. According to this so-called minimum intensity projection method, only those 3D image data along the selected length range are used, the intensity or density value of which is at a minimum. This type of target value calculation is particularly suitable, for example, for presenting metastases in the skullcap.

Finally, it can also be advantageous for different fields of application to calculate and store, as a target value, the average value of the 3D image data collected in the selected length range along each straight line up to defined distance from the skull surface. In this manner, the 3D image data are averaged and displayed over a selected thickness, whereby for example in fracture diagnostics, a faster and more reliable result can be achieved.

Apart from the above-described methods for calculating the target values, it is also possible to apply more complex search and find algorithms for the target values along each individual straight line. It is in particular useful for the fracture presentation that the straight lines are scanned 3D image point by 3D image point from the outside inward until a certain threshold value, e.g. 1500 HU, is reached. In order to present only the tabula externa of the skull, only the five image points following the threshold value are used for a maximum intensity projection and therefore only the tabula externa is imaged.

As an alternative to this, it is also possible to scan, 3D image point by 3D image point, each straight line proceeding from a defined distance from the skull surface and extending outward until a predefined threshold value, e.g. 1500 HU, is reached. Subsequently, the scanning direction along the straight line is changed again and from the 3D image point which has reached the threshold value, a predefined number of pixels, e.g. 10 to 80, is used for the maximum intensity projection for calculating the target value. With this method, subdural and subarachnoidal hemorrhages as well as epidural hemorrhages of the entire skull can be presented along a single layer. As an alternative to this, the target value calculation can also be performed with a minimum intensity projection, whereby apoplectic strokes can be visualized in a single image.

The image data of the 3D image data assigned to the nodes of the virtual planar net are finally presented as 2D image data in one plane on an adequate display. This presentation of the folded-open skull enables the attending physician or the diagnosing person to perform a fast diagnosis.

Prior to the presentation of the 2D image data, the latter can also be smoothed using different methods, for example by a moving average formation of the density values or the like.

If, according to a further feature of the invention, corresponding image data from the 3D image data of the skull in a plurality of distances from the skull surface are determined and the determined image data of the different distances from the skull surface are presented chronologically in succession as 2D image data in one plane, the viewer of the 2D image data can be provided with a fast overview about the situation of the skull in different depths from the skull surface. By playing such a film sequence, even clinical personnel trained to a lesser extent can be provided with an optimal overview within a very short time.

In particular for an improved fracture presentation, it is advantageous if the image data are determined in distances of 0 to 5 mm, in particular 0 to 3 mm from the skull surface, thus in particular in the region of the tabula externa of the skull.

When determining the image data for an improved fracture presentation, a selected length range of preferably 1 to 3 mm is covered.

For the presentation of hemorrhages within the skull, a selected length range of 10 to 30 mm is ideal.

For the presentation of apoplectic strokes, a selected length range of 10 to 60 mm is particularly suitable.

The 3D image data of the skull are preferably available with a layer thickness between 0.6 and 1.5 mm. This layer thickness is recommended for an optimal reconstruction. A very small reconstruction interval of, for example, 0.4 to 1 mm is also of advantage.

The object according to the invention is also achieved by a device for carrying out the method for processing 3D data of a skull, which device can preferably be formed by a suitable computer which is fed with the 3D image data. Due to the simplicity of the present image processing method, said method can also be carried out on a conventional personal computer or notebook in a very short time without the need of a workstation with correspondingly high computing power.

The present invention is explained in more detail by means of the attached drawings which show different steps of the method according to the invention.

DESCRIPTION OF VARIOUS AND PREFERRED EMBODIMENTS

Figure 1:
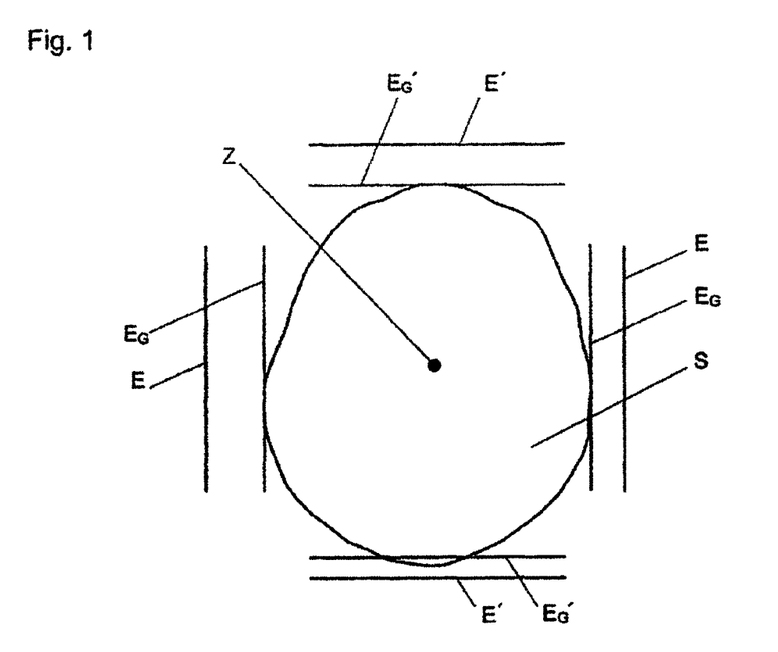
FIG. 1 shows a top view of a skull CT for clarifying the determination of the central axis through the skull.

FIG. 1 shows an image of a human skull S viewed from above which was taken, for example, with a computer tomograph. The presentation method is, for example, a maximum intensity projection of all CT images of the skull S, wherein substantially only the bony structure is visible. For determining a central axis Z through the skull S, two pairs of parallel virtual planes E, E' preferably arranged at right angles to each other are formed, and the planes E, E' of each pair are moved from a position on both sides of the skull S toward each other. As soon as the 3D image data of the skull S reach or exceed a predefined threshold value, for example a predefined density value in Hounsfield units (HU), the planes E and E' come to a standstill as so-called boundary planes $E_G$ and $E_G'$, respectively. Finally, the skull S is quasi clamped between the parallel boundary planes $E_G$ and $E_G'$. The section axis of the center planes arranged between the parallel boundary planes $E_G$, $E_G'$ is now defined as the central axis Z through the skull S.

Figure 2:
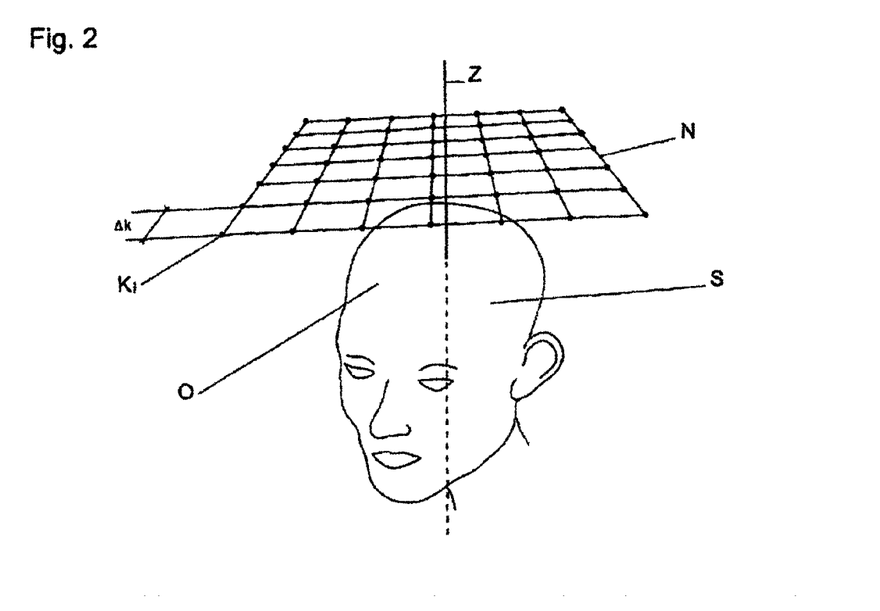
FIG. 2 shows a schematic diagram of a skull with a virtual planar net arranged thereabove for determining the skull surface.

According to FIG. 2, a virtual planar net N comprising a certain number of nodes $K_i$ which are spaced apart from each other corresponding to the mesh width Δk is now spanned for determining the skull surface O. The virtual planar net N is positioned perpendicular to the central axis Z and moved along the latter over the skull S. The number of nodes Ki, the dimension of the mesh width Δk and the size of the net N is variable and is preferably freely selectable within certain limits. The virtual, originally planar, net N ultimately corresponds to the imaging plane of the 2D image data of the skull S. All nodes $K_i$ are stored in the three-dimensional space, wherein on the one hand, the original position of the net N and, on the other, the end position on the skull surface O are stored. For determining the skull surface O, the net N, namely each individual node $K_i$ of the net N, is cyclically lowered by one image point onto the skull S. During each cycle it is checked if the 3D image data in the respective node $K_i$ have reached a predefined threshold value, for example a density value between 130 and 1500 HU. If the predefined threshold value is reached or exceeded, the corresponding image data are assigned to this node $K_i$ which was stored together with the coordinates. The node $K_i$ is then fixed in place and is not lowered during the next cycle. In order to prevent the net N from expanding during the further lowering onto the skull S, after each cycle, the distance of all nodes $K_i$ from each other is determined using vector analysis and the outer points are displaced inwardly to such an extent that the mesh width Δk in the 3D space remains constant and corresponds to the originally desired mesh width Δk. Thus, the virtual net N lays over the skull S like a physically real net. In this manner, the skull surface O can be determined in a suitable manner.

Figure 3A:
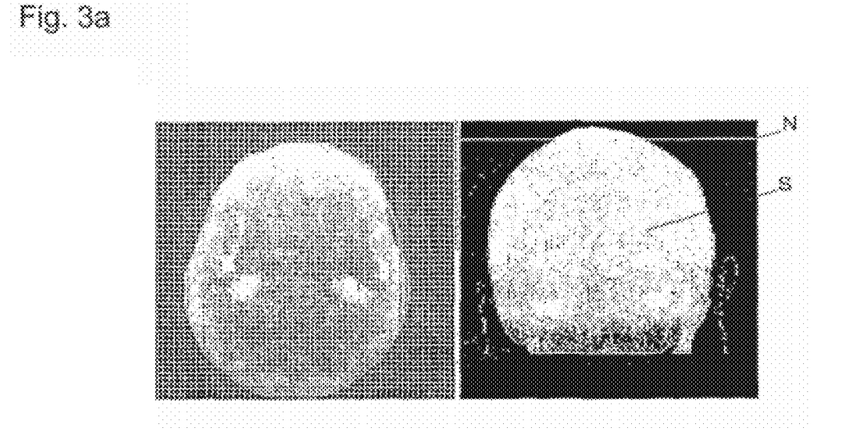
FIGS. 3a to 3c show different steps during the determination of the skull surface by means of a virtual planar net which is placed over the skull.
Figure 3B:
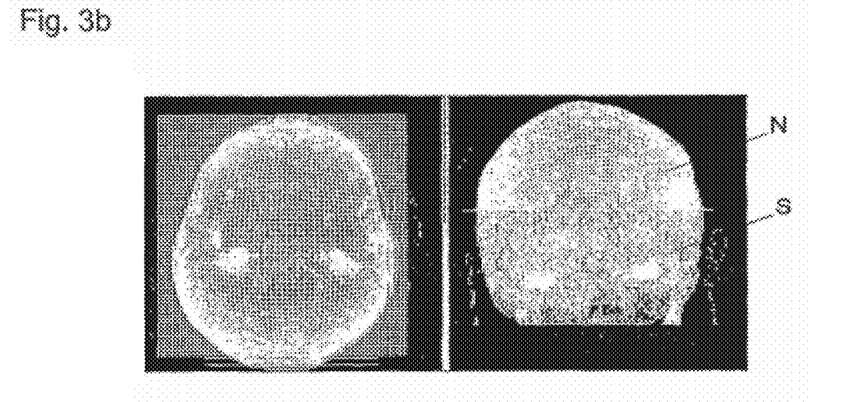
Figure 3C:
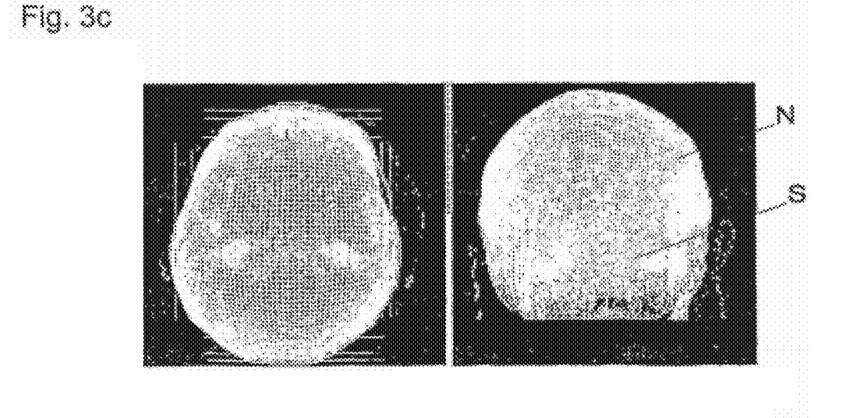

FIGS. 3a to 3c show this method of determining the skull surface O in three different procedural stages. Here, as described above, the virtual, originally planar net N is lowered over the skull S and the nodes $K_i$ of the net N are fixed when the associated 3D image data reach or exceed a predefined threshold value.

Figure 4:
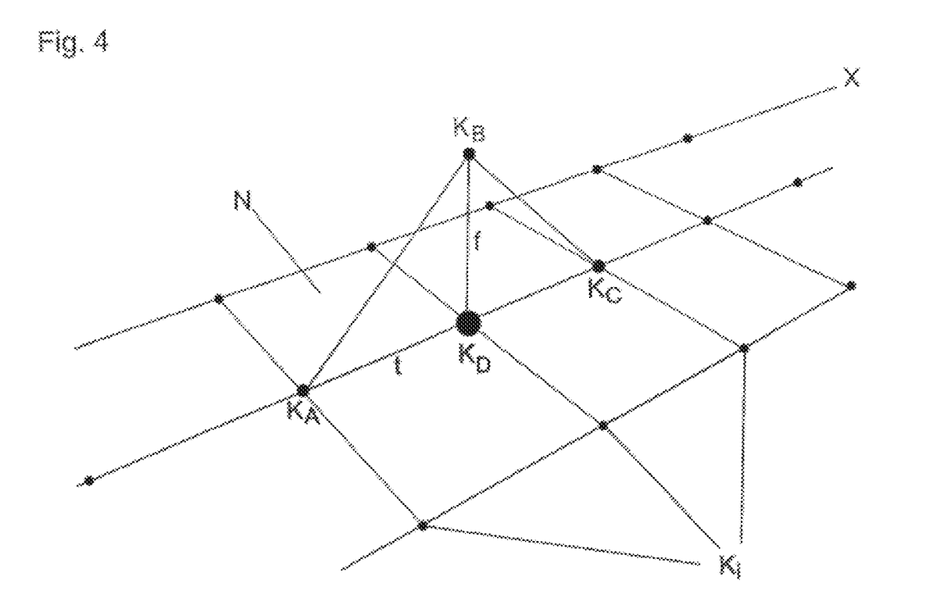
FIG. 4 shows a schematic diagram for illustrating a smoothing algorithm.

The net N situated on the skull surface O can now be smoothed because the skull surface O is often not completely smooth and, for example, artifacts can be caused by medical apparatuses such as hoses, cables and respirators. The smoothing algorithm can run, for example in the form of a loop, through all coordinates in the three-dimensional space, as exemplary shown by means of the diagram according to FIG. 4. Accordingly, in the axis x, first the node $K_A$ and the next but one node $K_C$ are defined and a straight line t is drawn therebetween. Between the nodes $K_A$ and $K_C$, the node $K_D$ is calculated. According to the smoothing algorithm, the distance f between the calculated node $K_D$ and the actual point $K_B$ is approximated by a third of the distance f to the initially calculated node $K_D$. This process can be repeated multiple times, e.g. 3 to 100 times, until a smooth surface is obtained. Without smoothing, the points such as, e.g., the node $K_B$ would result in an artifact in the presentation.

After the skull surface O as been determined and, if needed, smoothed (FIG. 4) by means of the virtual net N according to the FIGS. 2 and 3a to 3c, the actual folding-open of the skull into one plane begins. For this purpose, the virtual planar net N is divided into triangles and each formed triangle D is processed individually. Prior to segmenting, each node $K_i$ on the net corresponds also to a point in the 2D presentation. The original position of each node $K_i$ prior to the segmentation as well as the position of the point after the segmentation in the three-dimensional space is known. Due to the division into triangles D, it is possible through a simple vector analysis to assign any desired point on these surfaces prior to the deformation of the net N to the corresponding points after the deformation. The original net N is therefore calculated triangle D by triangle D and point by point so that for all 2D image data which are presented in one plane, the corresponding point on the skull surface O in the three-dimensional space of the 3D image data and in a defined distance d from the skull surface O is determined.

Figure 5A:
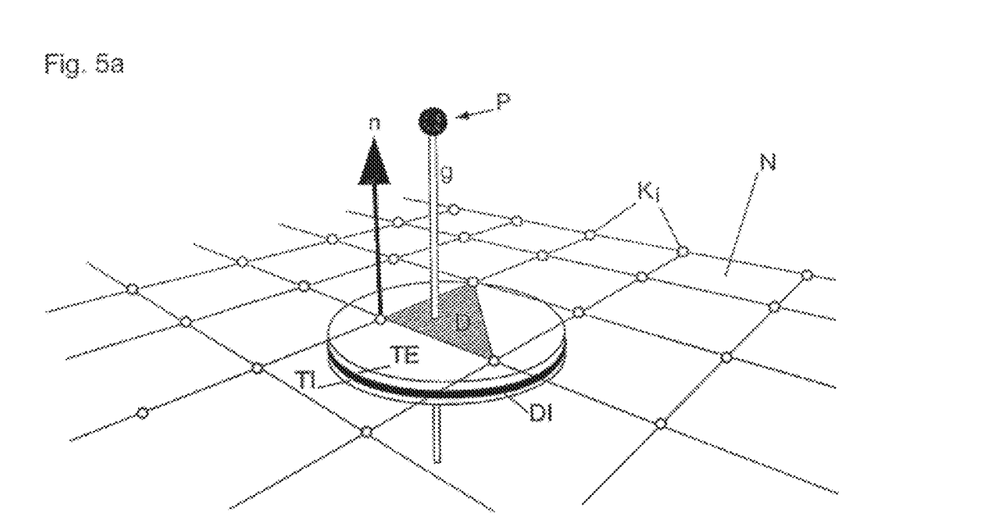
FIGS. 5a and 5b show views of a portion of the skullcap for explaining the image processing method according to the invention.
Figure 5B:
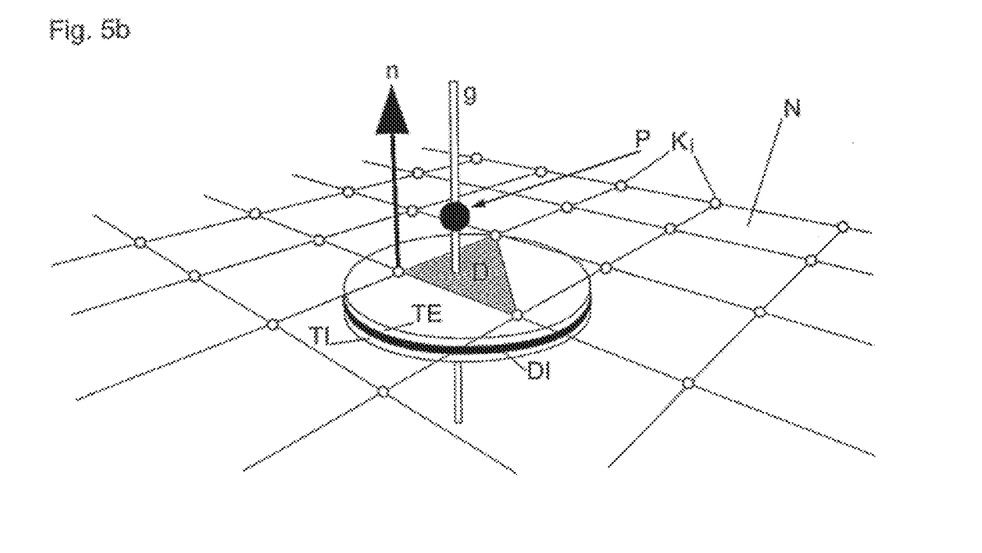

For determining the content of the 2D image data in each node $K_i$ of the virtual net N, different methods can be used. FIG. 5a and FIG. 5b show a portion of the skull S with the net N arranged thereon. Between three nodes $K_i$ of the net N, a triangle D is formed and the normal vector n on the triangle D is calculated. Along the straight line g which extends normal to the skull surface O and parallel to the normal vector n, all image data from the 3D image data in a selected length range Δd up to the defined distance d from the skull surface O are now read out from the outside inward. From the 3D image data in the selected length range Δd up to the defined distance d from the skull surface O, it is now possible, for example by using the MIP (maximum intensity projection) method, to simply use the content of those image data with the maximum intensity and store it as a target value. Instead of the MIP method, it is also possible to calculate and store the minimum density value of the 3D image data along the straight line g or an average value in the selected length range Δd along the straight line g. Through an adequate selection of the selected length range Δd, the structures in certain depths of the skull S, for example the tabula externa TE of the center layer D or the tabula interna TI, can be presented. If all layers (tabula externa TE, center layer D and tabula interna TI) are presented, the finer contours, which occur, for example, in the case of fractures, are blurred. In a modified MIP it is possible to use only the 3D image data from the outermost skullcap layer tabula externa for the presentation. This allows a fast and exact diagnosis of fractures.

For other applications it is possible to present also the regions inside the skullcap, for example the subarachnoidal space, according to this method and also the brain that rests on the inside against the skullcap. For this purpose, from a certain distance along the straight line, the target value calculation is performed outwardly along the straight line g.

Figure 6:
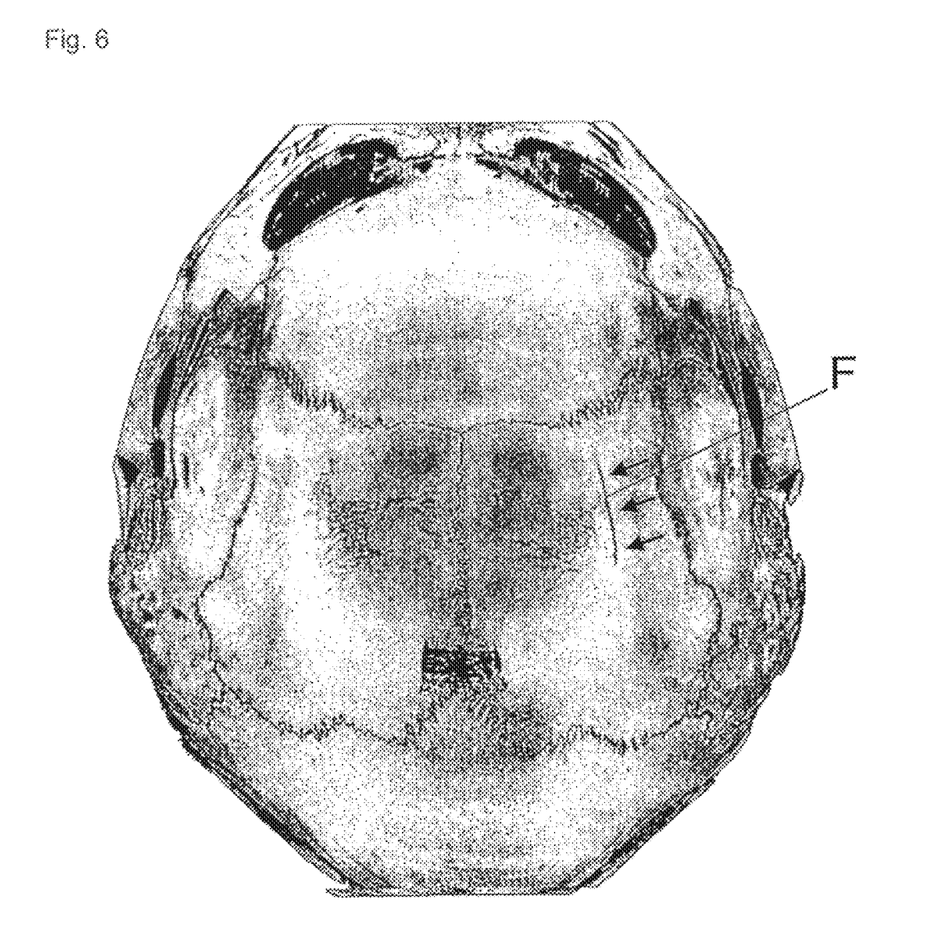
FIG. 6 shows a resulting image of a folded-open skull with a fracture.

FIG. 6 shows an example for generating a folded-up skull S having a fracture F in the region of the parietal bone.

Figure 7:
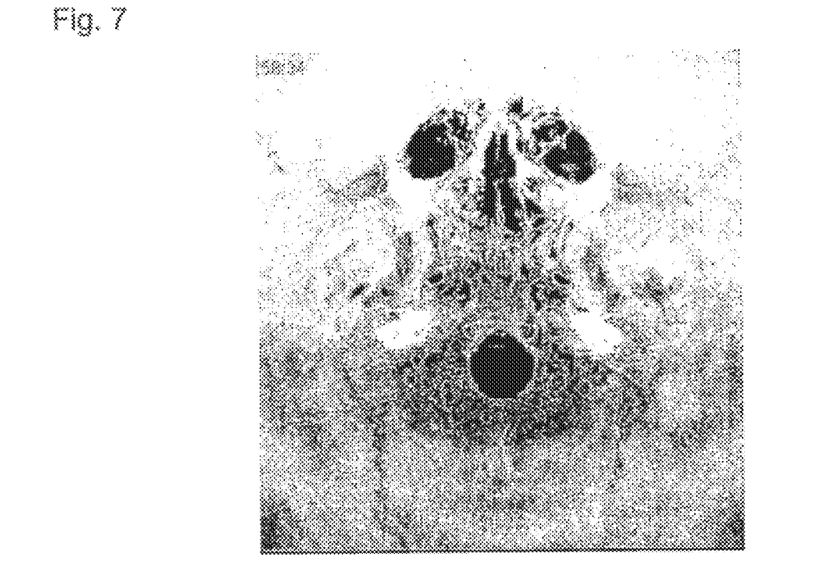
FIG. 7 shows a two-dimensional image of a folded-open skull base.

FIG. 7 shows a skull base without fractures folded up according to the method according to the invention. When presenting the skull base, the 3D image data of the skull are quasi turned over and the virtual net is lowered coming from the spinal column onto the turned skulled. In order to reduce artifacts, preferably a multiplicity of smoothing processes are carried out, for example 20 to 30 passes, before the folded-up skull is presented.

Figure 8:
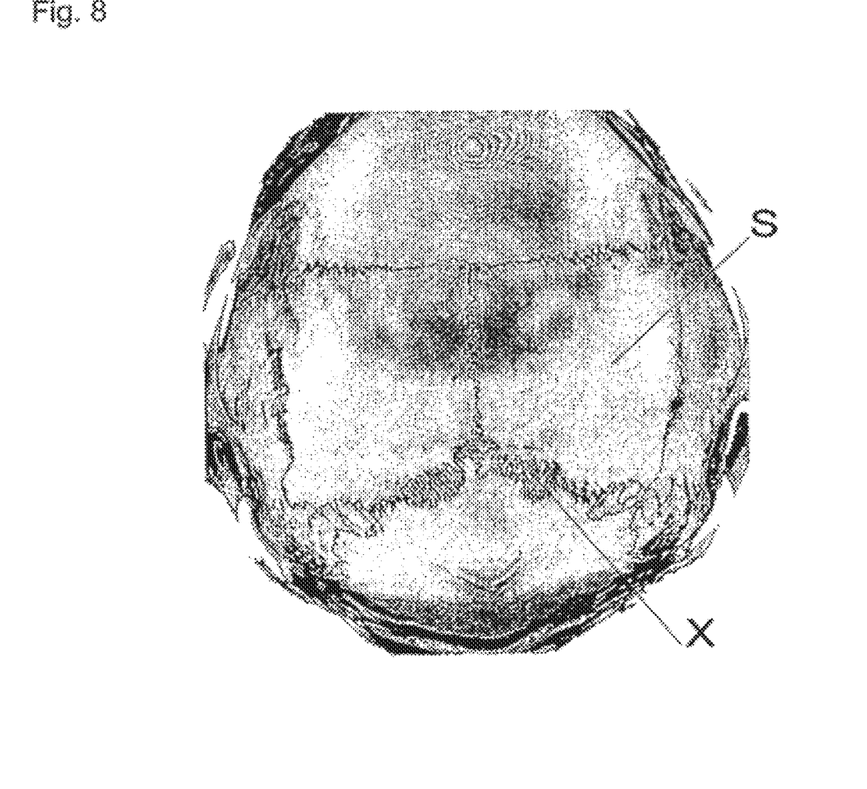
FIG. 8 shows a further image of a folded-open skull of a proband for illustrating the skull sutures.

FIG. 8 shows the image of a skull S of a young healthy proband, the skull being folded-up according to the method according to the invention. The skull sutures X are clearly visible. A pathological change of the skull sutures such as, e.g., a premature closure of the same, could be detected at an early stage by means of such a presentation, and a permanent deformation of the skull can be prevented by appropriate measures.

Figure 9:
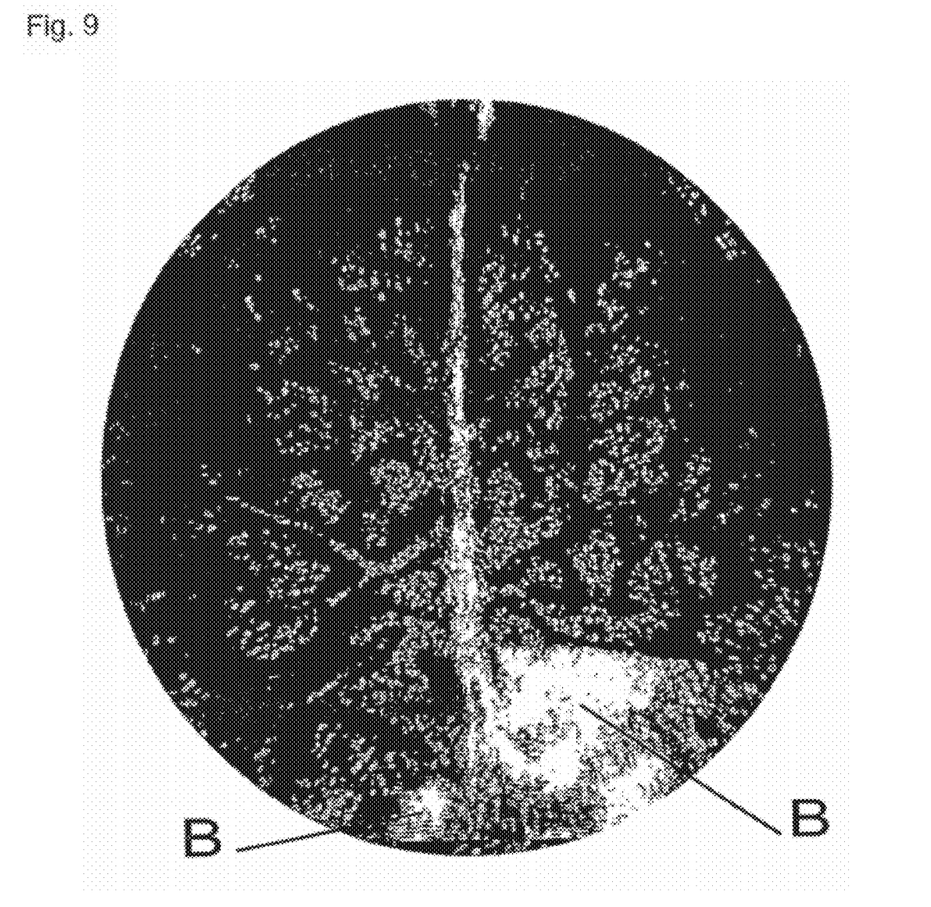
FIG. 9 shows an image of a portion of a folded-open skull in the inner region for illustrating hemorrhages.

FIG. 9 shows a presentation of a folded-up skull, wherein epidural hemorrhages B are visible.

Figure 10:
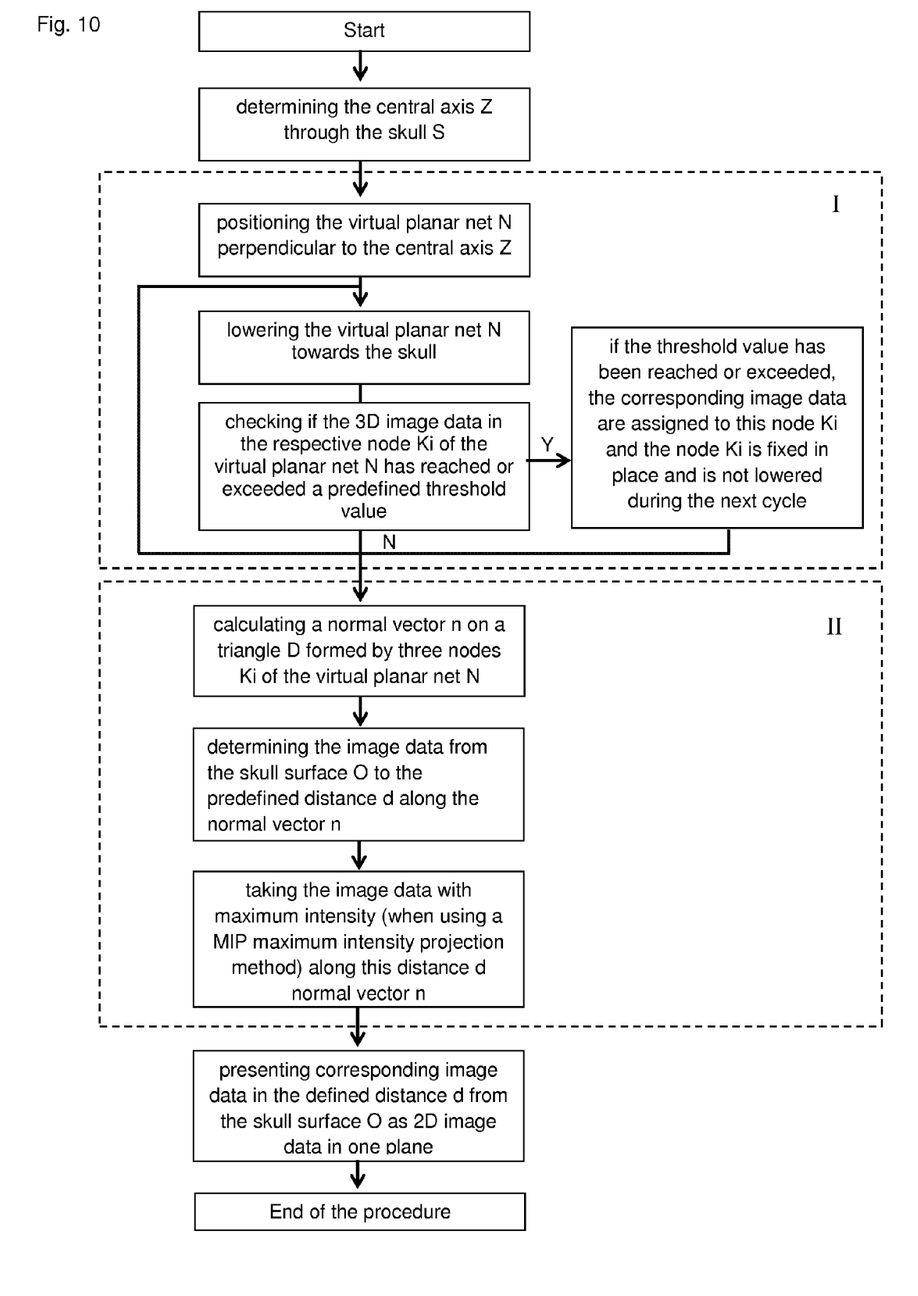
FIG. 10 shows a flow chart delineating the method for processing 3-D data as set forth in FIGS. 1-9.

FIG. 10 shows a flow chart delineating the method for processing 3D data as set forth in FIGS. 1-9. Block I shows the determination of the skull surface O with a virtual planar net N, Block II shows the determination of image data in distance d from the skull surface O.

Likewise, the method according to the invention can be used for a fast and simple diagnosis of changes inside the skullcap, and hemorrhages and apoplectic strokes can therefore be presented in a simple and fast manner.

The invention claimed is:

1. A method for processing 3D image data of a skull, comprising:
   selecting or calculating image data from the 3D image data, determining the skull surface from the 3D image data,
   determining and presenting corresponding image data in a defined distance (d) from the skull surface as 2D image data in one plane,
   wherein the skull surface is determined in that a virtual planar net comprising a certain number of nodes ($K_i$) with a certain mesh width ($\Delta k$) relative to each other is moved along an axis perpendicular to the net and over the skull, and wherein a position ($z_i$) of the axis, which is reached when the 3D image data at the node ($K_i$) reach or exceed a predefined threshold value, is assigned to the nodes ($K_i$) of the net.

2. The image processing method according to claim 1, wherein as the axis, a central axis through the skull is determined.

3. The image processing method according to claim 2, wherein the central axis is determined in that two pairs of parallel virtual planes (E, E'), preferably arranged at right angles to each other, are formed, the planes (E, E') of each pair are moved from a position on both sides of the skull toward each other, outer virtual boundary planes ($E_G$, $E_{G'}$) are defined as soon as the 3D image data in these boundary planes ($E_G$, $E_{G'}$) reach a predefined threshold value, and the central axis is defined as section axis of the center planes arranged between the parallel boundary planes ($E_G$, $E_{G'}$).

4. The image processing method according to claim 1, wherein as the predefined threshold value of the 3D image data, a predefined density value, preferably a certain value of a Hounsfield unit, is used.

5. The image processing method according to claim 1, wherein the determined skull surface is smoothed.

6. The image processing method according to claim 1, wherein between three adjacent nodes ($K_i$) of the virtual net, one triangle is formed, a normal vector (n) on each triangle is formed, and from the determined skull surface into the inside of the skull, all 3D image data along straight lines parallel to each normal vector (n) in a selected length range ($\Delta d$) up to a defined distance (d) from the skull surface are collected and target values are calculated therefrom and stored.

7. The image processing method according to claim 6, wherein, as a target value, that value of the 3D image data in the selected length region ($\Delta d$) along each straight line, a density value of which is at a maximum, is calculated and stored.

8. The image processing method according to claim 6, wherein, as a target value, that value of the 3D image data in the selected length region ($\Delta d$) along each straight line, the density value of which is at a maximum, is calculated and stored.

9. The image processing method according to claim 6, wherein, as a target value, an average value of the 3D image data collected in the selected length range ($\Delta d$) along each straight line up to defined distance (d) from the skull surface is calculated and stored.

10. The image processing method according to claim 6, wherein the image data of the 3D image data assigned to the nodes (Ki) of the virtual planar net are presented as 2D image data in one plane.

11. The image processing method according to claim 10, wherein the 2D image data are smoothed prior to presentation.

12. The image processing method according to claim 11, wherein the 2D image data are smoothed by moving average formation of density values.

13. The image processing method according to claim 6, wherein the image data are collected over a length range ($\Delta d$) of 1 to 3 mm.

14. The image processing method according to claim 6, wherein the image data are collected over a length range ($\Delta d$) of 10 to 30 mm.

15. The image processing method according to claim 6, wherein the image data are collected over a length range ($\Delta d$) of 10 to 60 mm.

16. A method for processing 3D image data of a skull, comprising:
   selecting or calculating image data from the 3D image data
   determining the skull surface from the 3D image data,
   determining and presenting corresponding image data in a defined distance (d) from the skull surface as 2D image data in one plane,
   wherein corresponding image data from the 3D image data of the skull in a plurality of distances ($d_i$) from the skull surface are determined, and determined image data of the different distances ($d_i$) from the skull surface are presented chronologically in succession as 2D image data in one plane.

17. The image processing method according to claim 16, wherein the image data in distances (d) of 0 to 5 mm from the skull surface are determined.

18. The image processing method according to claim 17, wherein the image data in distances (d) of 0 to 3 mm from the skull surface are determined.

19. A method for processing 3D image data of a skull, comprising:
   selecting or calculating image data from the 3D image data,
   determining the skull surface from the 3D image data,
   determining and presenting corresponding image data in a defined distance (d) from the skull surface as 2D image data in one plane,
   wherein 3D image data of the skull with a layer thickness between 0.6 and 1.5 mm are used.

20. A device for carrying out a method for processing 3D image data of a skull according to claim 1.

* * * * *